://

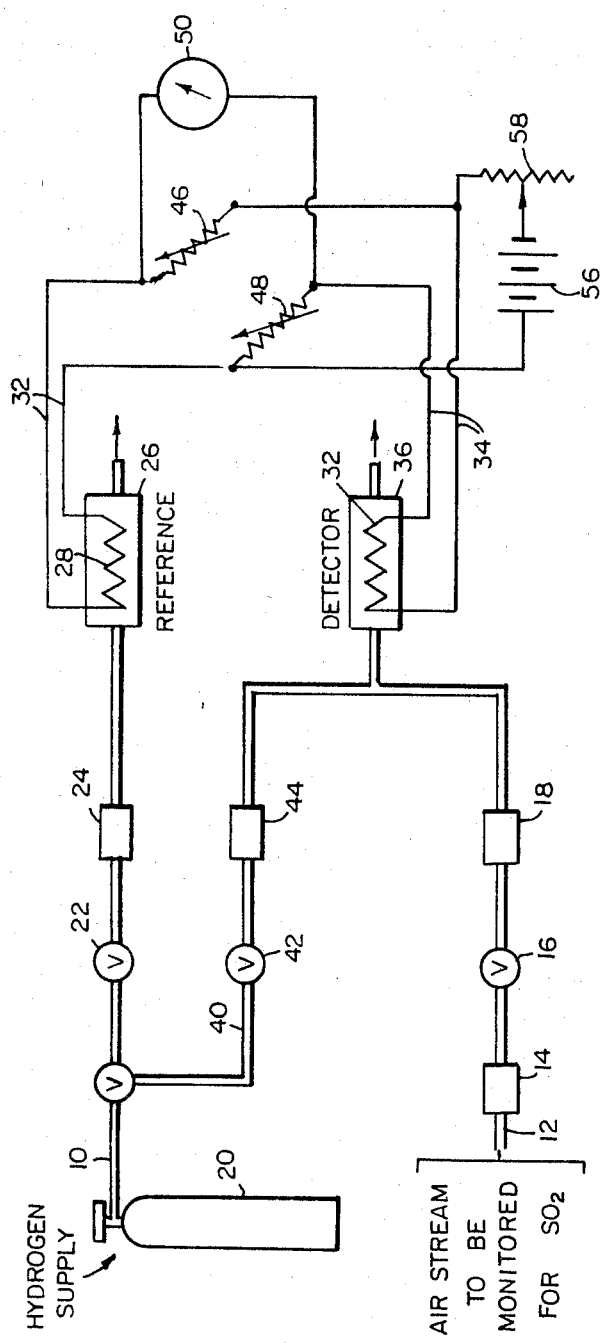

United States Patent Office 3,437,446
Patented Apr. 8, 1969

3,437,446
APPARATUS FOR AND METHOD OF DETECTING SULFUR-CONTAINING COMPOUNDS
Russell W. Pierce, Arlington, Mass., assignor, by mesne assignments, to Abcor, Inc., Cambridge, Mass., a corporation of Massachusetts
Filed Oct. 23, 1965, Ser. No. 503,845
Int. Cl. G01n 27/12, 31/06
U.S. Cl. 23—232                                       8 Claims

ABSTRACT OF THE DISCLOSURE

Detection in fluid streams of, e.g., sulfur containing compounds, oxides of nitrogen, carbon dioxide, etc., is accomplished by measuring the changes in the electrical resistivity of a sensing element as a result of the reversible poisoning of the element by the compound to be monitored.

---

My invention concerns a means and system for the rapid sensitive non-electrolytic detection of specific chemical species in fluid streams, and in particular relates to an apparatus for and a method of detecting and measuring sulfur-containing compounds in a gas stream, such as the detection of sulfur dioxide in air streams.

Due to the increasing importance of air pollution and the monitoring of industrial gas streams, there exists an immediate need for a rapid, sensitive, inexpensive, continuous method of detecting sulfur-containing compounds, oxides of nitrogen, carbon dioxide, and other gases and compounds in fluid streams. In particular, the detection of sulfur dioxide in air streams and the detection of the oxides of nitrogen in combustion exhaust streams such as an automobile exhaust stream, is a matter of present importance. Present methods for the detection and measuring of the concentration of these compounds are quite often expensive, insensitive, awkward or often require the use of liquid test methods with problems of continual regeneration or re-supply of liquids or other chemicals employed in the detecting test.

It is, therefore, an object of my invention to provide a rapid, sensitive and relatively inexpensive means to detect specific chemical species by a non-electrolytic method.

It is also an object of my invention to provide an apparatus for and a method of measuring or detecting sulfur-containing compounds such as sulfur dioxide in air streams. Other objects and advantages of my invention will be apparent to those persons skilled in the art from the following more detailed description of my invention taken in conjunction with the accompanying drawing wherein there is shown a schematic illustration of a means of measuring and detecting sulfur dioxide in an air stream.

Briefly my method comprises means for detecting a compound which forms a reversible, "poisoning" or chemi-absorption or reaction product with a sensing element. The sensing element comprises a material, the surface of which is reversibly poisoned or otherwise effected by the specific chemical species to be detected in a gas stream. Besides being surface "poisoned" by the specific compound in the gas stream, the sensing element must also be capable of absorbing a gas which is added to the gas stream to be monitored and which added gas changes the electrical properties such as the resistivity of the sensing element. The degree of absorbing of the gas should be a function of the poisoning of the surface of the sensing element. In practice then, my invention requires the novel combination of one or more sensing elements, a gas stream containing a chemical species to be measured or detected and an absorbing gas stream which is added to and capable of being absorbed by the sensing element and effecting a measurable property thereof.

As a specific example of my invention I will describe a system for the detection and measurement of elemental sulfur or specific sulfur-containing compounds such as sulfur dioxide, hydrogen sulfide, mercaptans, sulfur trioxide, organic sulfides, carbonyl sulfides thio compounds and the like in a fluid stream. As is recognized, the determination of these materials is a matter of considerable importance in pollution studies and control methods. In this embodiment the sensing element comprises one or more metal electrical resistant elements included in a balanced electrical circuit system or measuring bridge such as a Wheatstone bridge circuit. The sensing element may comprise a coiled wire or consist of a thin film of the desired metal on a substrate of an electrical insulator such as a plastic film or a ceramic piece. The metal film may be deposited on the insulator by any of several methods such as by vapor plating, electro plating, vacuum deposition and the like. Often deposition of extremely thin films, e.g., 0.5 to 5 mil thickness, rather than coiled wire elements is advantageous because such thin films maximize the surface to volume ratio between the gas stream to be monitored and the sensing element and, thereby minimizing any bulk diffusion rate limitation on the response time of the sensing element. The bulk diffusion rate is often an important limiting feature where the sensing element is palladium and the absorbing gas is hydrogen, since such systems depend for their operation upon the dynamic equilibrium of hydrogen entering and departing from the palladium metal sensing element.

My $SO_2$ sensing element may comprise palladium, platinum, palladium alloys such as palladium-silver alloys or other materials or metals which absorb varying amounts of hydrogen gas with attendant changes in the electrical resistivity of the sensing element as a function of the gas absorbed. Additionally, the sensing element selected should be susceptible to the various gaseous substances to be detected in the gas stream. For example, a palladium sensing element is susceptible to sulfur dioxide and hydrogen sulfide and the like, which "poisons" the external surface with a reactive or chemi-absorbed material such as palladium sulfide. The poisoning effect on the sensing element is reversible in that the removal of the sulfur from the gas stream to be monitored will permit the sensing element in the presence of the added hydrogen to regain its initial hydrogen solubility properties.

For example, in the detection of sulfur dioxide in an air stream employing a palladium sensing element as part of a balanced bridge circuit, and employing hydrogen as the gas to be added to the air stream, a rapid, sensitive means for measuring and detecting sulfur dioxide in the air stream is provided. In practice, a known partial pressure of hydrogen is added to the air sample stream to be monitored and in which the sulfur dioxide level is to be detected and determined. Any sulfur-containing material in the air stream such as sulfur dioxide will then poison the surface of the palladium element to some greater or lesser extent, depending in increasing degree upon the ratio of the partial pressure of sulfurous material to that of the hydrogen present and added to the air stream. The accompanying change in resistivity of the sensing element is then used to indicate the sulfur level in the air stream under test. The detecting system may be made specific for a particular sulfur compound by resorting to an absorption train or other devices to remove all but the compound whose particular detection and measurement is desired.

The change in resistivity of the sensing element will vary with the poisoning of the external surface of the element, thereby increasing or decreasing the absorbtivity of the hydrogen in the sensing element. A single sensing element may be employed in the air stream to be monitored and containing the hydrogen with the air stream passed through a detection cell containing the sensing element.

In another embodiment, a combination of a reference cell and a detection cell may be employed in which the hydrogen stream is passed through and in contact with a sensing element in a reference cell to establish a base line or electrical resistivity reference system, and the air stream to be monitored with added hydrogen at the same partial pressure then passed through a detecting cell. The differences between the reference cell and detecting cell serves as a function of the sulfur compound in the air stream. The presence of sulfur dioxide in the air stream reacts upon the surface of the palladium sensing element affecting the concentration of hydrogen in the air stream which can be absorbed into the palladium sensing element. A bridge circuit in which the sensing element is employed is then unbalanced by the change in resistivity and the degree of unbalancing measured or recorded by a galvanometer or other recording means. When the sulfur dioxide or other sulfur-containing gas disappears from the air stream, the reversible poisoning compound disappears, the hydrogen in the air stream again re-enters the sensitive palladium sensing element, and the balanced circuit is then returned to its preselected reference value or balanced condition.

A typical detecting system is illustrated in the accompanying drawing wherein an air stream is monitored for the detection of sulfur dioxide with the air stream introduced into an air inlet conduit 12 containing a pump 14, a metering valve 16 and airflow meter 18. The air inlet or sampling conduit 12 leads to a detecting cell 36 which contains a chamber having an inlet and an outlet and in which chamber is disposed a coiled palladium wire 32 electrically connected by leads 34 to a Wheatstone bridge or other circuit arrangement which detects the changes in electrical resistivity of the palladium element 32. Hydrogen gas from a hydrogen supply 20 is introduced into a first hydrogen inlet conduit 10 containing a metering valve 22 and a flow meter 24. The hydrogen is introduced into the inlet of a reference cell 26 which contains therein an identical palladium sensing element 28 as element 32 connected by leads 30 to the opposite side of the balanced bridge to serve as a base or reference value in comparison with the value obtained in the circuit by the detecting cell 36. A record inlet hydrogen conduit 40 introduces the hydrogen at the same partial pressure as in the reference cell 26 into the air inlet conduit 12 to mix with the air stream to be monitored for sulfur dioxide, prior to introduction of the air stream into the detecting cell 36. In this system any changes in the sulfur dioxide or sulfur-containing compounds in the air stream will be accompanied by the change in the resistivity of the palladium element 32 in the detecting cell 36, while the reference cell 26 will serve as a fixed value indicating the resistivity of the hydrogen uneffected by the surface poisoning of the sulfur dioxide compounds in the air stream. The sensing element 28 forms one leg with variable resistor 48 of a Wheatstone bridge circuit and the sensing element 32 forming another leg with variable resistor 46 with the unbalancing of the circuit by the presence of $SO_2$ indicated by galvanometer 50. A source of direct current power 56 is provided for the bridge through variable resistor 58.

My system has been described for the purposes of illustration only as a means of detecting the presence of sulfur compounds in fluid streams. However, my system may also be employed to detect and monitor a wide variety of fluid streams for various and specific chemical species. For example, in another embodiment my sensing element may comprise silver or a silver alloy or other noble metal in which oxygen is absorbed, thereby effecting the electrical resistivity of the silver sensing element. The external surface of the silver sensing element is also reversibly poisoned by and sensitive to sulfur-containing gases as well as oxides of nitrogen. Thus, a silver sensing element may be used to detect and monitor the presence of sulfur or oxides of nitrogen in the gas stream. As before, sulfur-containing compounds may be removed by conventional methods, and then the silver sensing element employed as a detector merely of the oxides of nitrogen which form reversible poisoning compounds on the surface of the silver sensing element. My method also applies to other metal-gas systems such as the use of nickel sensing elements with carbon monoxide as the added gas and with copper sensing elements employing oxygen as the added gas, since each of these sensing systems absorb gas and change in resistivity as a function of the amount of absorption, with the sensing element capable of being poisoned by a wide variety of compounds.

Further, certain alloys of two or more metals as sensing elements having gas dissolving and surface sensitivity properties quite different from any individual metal alone, may be employed. For example, the surface of certain copper-palladium alloys is reversibly poisoned by carbon dioxide and, therefore, sensing elements of this type may be used to detect the presence of carbon dioxide in fluid streams with hydrogen as the added gas to the stream. My method is particularly adapted to pure metal-gas systems, such as have been described; however, my method may also be employed with the gas to be detected dissolved in a liquid as for example oxygen dissolved in a water stream as a measure of stream pollution. The response time of liquid systems, however, is slower than that for the gas systems.

In another embodiment of my invention, other compounds such as the oxides of nitrogen may be detected by the addition of a third substance to the gas stream to nullify or to decrease the effect of the compound poisoning the surface of the sensing element again in a reproducible and reversible manner. This selective and reversible surface poisoning of the sensing element may be carried out for example with a stream of fixed, partial pressure ratio of say hydrogen sulfide and hydrogen is passed over a palladium sensing element so that an equilibrium or steady equilibrium value of resistivity of the sensing element is obtained. The addition of oxygen or oxides of nitrogen like $NO_1$, $NO_2$, $N_2O_4$, $N_2O$, etc. added to this stream creates a certain "clean-up effect" on the catalyst poisoning caused by the hydrogen sulfide and, therefore, serves as a function of the concentration of the added third constituent, that is, the oxygen or the oxides of nitrogen. This method is particularly important in the study and control of exhaust gases from internal combustion engines. With the use of palladium as a sensing element, the sensing element is often heated to the temperature approximately 300° to 350° C. by independent heating means. Heating of the palladium sensing element provides a more sensitive measure of the detection of sulfur compounds in the gas stream.

The sensing element may also take the form of a straight or coiled capillary tube rather than a solid wire as described. The capillary form is desirable where hydrogen might be entrapped within a solid wire by the rapid poisoning of the external wire surface. With a capillary tube the gas absorbed by the sensing element may escape through the interior passage of the element which is not in contact with the sulfur-containing gas stream. Further, any entrapped gas in the sensing element may be purged from the sensing element through the use of an inert purge gas like nitrogen passed from a source through the interior capillary passage. The purge gas will lower the partial pressure of the absorbed gas in the capillary creating a partial pressure difference and thereby providing means to remove rapidly the absorbing gas from the element.

In summary, my method permits the measure and detection of a wide variety of compounds in fluid streams.

In particular my method permits the measuring and detecting of the presence of sulfur compounds in a gas stream by adding hydrogen to a gas stream to be monitored and measuring the resistivity of the heated sensing element in that monitoring stream. The presence of a small amount of sulfur compounds in the monitoring stream will be indicated by a large decrease in resistivity of the sensing element, indicating the surface poisoning of the sensing element by the sulfur and the reduction in absorbtivity of the hydrogen in the sensing element. When the sulfur compound in the monitoring stream changes in concentration or disappears, the resistivity will increase because the poisoned surface will be removed by the reaction of hydrogen on the palladium sulfide on the surface to give in effect a clean sensing element and thereby restore the prior degree of hydrogen absorbtivity.

What I claim is:

1. An apparatus for the monitoring of a fluid stream for a chemical compound capable of inhibiting the adsorption of a gas by a metal which comprises in combination:

a metal sensing element; a source of a gas; a source of a fluid stream to be monitored for a specific chemical compound; means to introduce the said gas from said gas source into the fluid stream to give a predetermined partial pressure of the gas in the stream; a means to pass the fluid stream with the said gas therein into contact with the sensing element; and means to detect the changes in electrical resistivity of the sensing element as a function of the degree of said gas absorbed, the sensing element characterized (1) by being capable of exhibiting a detectable change in electrical resistivity as a function of the amount of the said gas absorbed therein and (2) by the external surface of the sensing element capable of being reversibly poisoned by the specific chemical compound to be monitored in the fluid stream, which poisoning effects the absorbtivity by the sensing element of the absorbing gas to a degree which is a function of the concentration of said chemical in said fluid stream.

2. An apparatus for the monitoring or the detection of sulfur compounds in a gas stream, which apparatus comprises in combination:

a metal sensing element; means to heat the metal sensing element to a predetermined temperature; a source of hydrogen gas and a source of a gas stream to be monitored for the presence of sulfur-containing compounds; means to introduce a predetermined partial pressure of the hydrogen gas from its source into the gas stream; and means to pass the gas stream containing the hydrogen into a detecting cell containing the metal sensing element, the metal sensing element characterized by being made of material capable of exhibiting a detectable change in electrical resistivity as a function of the amount of hydrogen absorbed therein, and the external surface of the sensing element capable of being reversibly poisoned by the sulfur-containing compounds to be monitored in the gas stream which poisoning effects the absorbtivity of the sensing element of the hydrogen; to a degree which is a function of the concentration of said sulfur-containing compound in said fluid stream and means to detect the changes of electrical resistivity of the sensing element.

3. An apparatus as set forth in claim 2 which includes a reference cell, a second metal sensing element in the reference cell and substantially the same as the metal sensing element in the detecting cell; means to heat said second sensing element to the same temperature as the element in the detecting cell and means to pass the hydrogen gas at the same partial pressure as the hydrogen gas in the gas stream to be monitored into contact with said second sensing element, thereby providing a base reference electrical resistivity of the second sensing element as a reference system for changes in electrical resistivity of the first sensing element.

4. A method of monitoring a fluid stream for the presence of chemical compounds capable of inhibiting the absorption of a gas by a metal which method comprises:

providing a fluid stream to be monitored for a particular chemical compound;

introducing into the stream to be monitored a predetermined amount of a gas to be absorbed;

providing a metal sensing element which changes in electrical resistivity as a function of the amount of the gas absorbed in the sensing element; and the external surface of which sensing element is capable of being poisoned by the chemical compound to be monitored in the fluid stream;

passing the fluid stream containing the gas to be absorbed into contact with the sensing element; and detecting the changes in electrical resistivity of the sensing element as a function of the chemical compound in the fluid stream which poisons the surface of the sensing element.

5. The method of claim 4 wherein said sensing element is a heated metal sensing element, the fluid stream is a gas stream, and the compound to be detected is a sulfur-containing compound.

6. The method of claim 4 wherein the sensing element is of silver, the gas to be absorbed is oxygen, and the compound to be detected is selected from the group consisting of oxides of nitrogen.

7. The method of claim 4 wherein the metal sensing element is a palladium element, the gas to be absorbed is hydrogen, and the compound to be detected is sulfur dioxide.

8. A method of monitoring the presence of sulfur-containing compounds in a gas stream which method comprises:

providing a gas stream to be monitored for a sulfur-containing compound;

introducing into the gas stream to be monitored a predetermined partial pressure of hydrogen gas;

contacting a heated palladium sensing element with the gas stream containing the added hydrogen gas; and detecting the change in electrical resistivity of the heated sensing element as a function of the sulfur-containing compounds in the gas stream.

References Cited

UNITED STATES PATENTS 3,242,717   3/1966   Matle et al.

OTHER REFERENCES

Lahiri, et al., Chemical Abstracts, vol. 59, p. 12449, (1963).

MORRIS O. WOLK, Primary Examiner.

ELLIOTT A. KATZ, Assistant Examiner.

U.S. Cl. X.R.

23—230 2, 254; 252—472; 73—27; 324—30, 71